(12) United States Patent
McGreevy et al.

(10) Patent No.: US 12,337,970 B2
(45) Date of Patent: Jun. 24, 2025

(54) DOOR ASSEMBLY FOR PASSENGER SEATING

(71) Applicant: Thompson Aero Seating Limited, Craigavon (GB)

(72) Inventors: Jonathan McGreevy, Camlough (GB); Aaron Robinson, Portadown (GB); Neil Rogers, Kilkeel (GB)

(73) Assignee: Thompson Aero Seating Limited, Craigavon (GB)

( * ) Notice: Subject to any disclaimer, the term of this patent is extended or adjusted under 35 U.S.C. 154(b) by 0 days.

(21) Appl. No.: 17/726,170

(22) Filed: Apr. 21, 2022

(65) Prior Publication Data

US 2022/0340283 A1 Oct. 27, 2022

(30) Foreign Application Priority Data

Apr. 21, 2021 (GB) ..................................... 2105685

(51) Int. Cl.
*B64D 11/06* (2006.01)

(52) U.S. Cl.
CPC ................ *B64D 11/0606* (2014.12)

(58) Field of Classification Search
CPC ...... E06B 2003/346; E06B 3/32; E06B 3/346; E06B 3/42; E06B 3/46; E06B 3/4618; E06B 3/4636; E06B 3/4654; E06B 3/4423; E06B 7/36; E06B 7/362; E06B 7/367; E06B 9/0646; E05Y 2900/14; E05Y 2900/212; E05D 2015/586
USPC .......................................... 49/176, 177, 323
See application file for complete search history.

(56) References Cited

U.S. PATENT DOCUMENTS

| 3,051,522 A | 8/1962 | Myers | |
| 4,911,219 A * | 3/1990 | Dalrymple | B61D 19/003 160/202 |
| 4,989,808 A * | 2/1991 | Spraggins | B64C 1/1438 244/129.5 |
| 6,186,444 B1 * | 2/2001 | Steel | B64D 11/0023 160/214 |
| 10,926,879 B2 * | 2/2021 | Bonnefoy | B64D 11/0606 |

(Continued)

FOREIGN PATENT DOCUMENTS

| CN | 110946417 | 4/2020 |
| DE | 102019121620 A1 | 2/2020 |

(Continued)

OTHER PUBLICATIONS

European Search Report of corresponding European Application No. 22168652.0 mailed Aug. 29, 2022.

(Continued)

*Primary Examiner* — Christopher D Hutchens
*Assistant Examiner* — Michael A. Fabula
(74) *Attorney, Agent, or Firm* — Gardner, Linn, Burkhart & Ondersma LLP

(57) ABSTRACT

A door assembly for passenger seating comprises a base having a leading end in which a recess is formed, and a door that is curved in end cross-section. The door is pivotable with respect to the base and, in an open state, the rearward end of the door is located in the recess. The arrangement reduces the space in the forward direction that is required to accommodate the door, and so facilitates provision of a minimum size of gap between seat rows without having to increase inter-row pitch.

10 Claims, 5 Drawing Sheets

(56) References Cited

U.S. PATENT DOCUMENTS

| | | | |
|---|---|---|---|
| 11,084,587 B2 | 8/2021 | Robinson | |
| 11,591,063 B2* | 2/2023 | Zekiecki | B64D 11/0023 |
| 2004/0173327 A1* | 9/2004 | Steel | E06B 3/4654 |
| | | | 160/210 |
| 2005/0046124 A1 | 3/2005 | Zwolinski et al. | |
| 2013/0241247 A1* | 9/2013 | Wallace | B64D 11/0604 |
| | | | 297/118 |
| 2016/0059966 A1* | 3/2016 | Dryburgh | B64D 11/0604 |
| | | | 244/118.6 |
| 2017/0106980 A1* | 4/2017 | Kuyper | B64D 11/0604 |
| 2018/0281963 A1* | 10/2018 | Dowty | B64D 11/0606 |
| 2019/0112859 A1 | 4/2019 | Cumbo | |
| 2019/0144098 A1* | 5/2019 | Gallagher, Jr. | E05D 15/0604 |
| | | | 244/118.5 |
| 2019/0233114 A1* | 8/2019 | Fullerton | B64D 11/0023 |
| 2019/0329891 A1 | 10/2019 | Bonnefoy et al. | |
| 2021/0163140 A1* | 6/2021 | Jasny | B64D 11/0606 |
| 2021/0179254 A1* | 6/2021 | Scotford | E05D 15/0621 |
| 2022/0001989 A1* | 1/2022 | Peat | B64D 11/0606 |

FOREIGN PATENT DOCUMENTS

| | | | | |
|---|---|---|---|---|
| EP | 3225548 | | 4/2017 | |
| GB | 2548901 A | * | 10/2017 | B64C 1/1423 |
| WO | WO-2020020658 A1 | * | 1/2020 | B64D 11/0602 |
| WO | 2020213861 | | 10/2020 | |
| WO | WO-2021069883 A1 | * | 4/2021 | B64D 11/0023 |
| WO | WO-2021069886 A1 | * | 4/2021 | B64D 11/0023 |
| WO | WO-2021084470 A1 | * | 5/2021 | B64D 11/0023 |
| WO | WO-2021084479 A1 | * | 5/2021 | B64D 11/0023 |

OTHER PUBLICATIONS

UK Search Report of corresponding Application No. GB2105685.8, dated Sep. 30, 2021.

* cited by examiner

DOOR ASSEMBLY FOR PASSENGER SEATING

FIELD OF THE INVENTION

This invention relates to door assemblies and, in particular, to door assemblies for use with passenger seating.

BACKGROUND TO THE INVENTION

It is known for passenger seating to include door assemblies for providing passengers with privacy. However, in typical applications space is at a premium and accommodating the door assembly can increase the space requirements of the passenger seating, which can be undesirable. For example, in an aircraft cabin seats are typically arranged in rows and the pitch between adjacent rows is an important factor in competing design considerations. In particular, it is desirable to maximize the pitch to increase passenger comfort, but if the pitch is too large then the number of rows that can be accommodated in the cabin is reduced, which adversely affects carrier revenue. Further, in order to meet safety regulations the seating may have to provide a specified minimum emergency egress width, which is determined at least in part by the pitch. Providing a door assembly complicates such design considerations as it can reduce the emergency egress width and so necessitate a larger pitch than would be required if the door was not present. This is a particular problem in cases where the door assembly includes a hinged door since the space required to accommodate the hinging action of the door tends to reduce the emergency egress width.

SUMMARY OF THE INVENTION

In one form of the present invention, a door assembly includes a base having a leading end in which a recess is formed, and a door having a leading end and a rearward end, and being curved in end cross-section. The door is pivotable with respect to the base between a closed state and an open state about at least one pivot axis, and in the open state, the rearward end of the door is located in the recess.

Optionally, the recess is provided by a cut-out portion in the leading end of the base, such as in a leading edge of the leading end of the base. Optionally, the recess is formed along the entire length, or substantially the entire length, of the leading end of the base, such as a leading edge of the leading end of the base.

Optionally, the recess is curved, such as along the entire length, or substantially the entire length, of the leading end of the base, such as a leading edge of the leading end of the base. The recess may have a curvature that matches, substantially matches or otherwise corresponds to a curvature of the rearward end of the door.

In one aspect, the base is curved in end cross-section. The base may have a curvature that matches, substantially matches or otherwise corresponds to the curvature of the door.

In another aspect, the door is shaped to curve outwardly, typically having an inside face and an outside face, the outside face being convex and in the inside face being concave.

Optionally, the recess is formed in an outer portion of the leading end, such as in an outer leading edge.

In yet another aspect, the leading end of the base defines a mouth of a compartment, and the recess is formed in an edge of the mouth, such as an outer edge of the mouth.

Advantageously, the door and the recess are shaped and dimensioned such that, when the door is in the open state, the rearward end of the door fits into the recess.

Typically, the door comprises a first part pivotably coupled to a second part at a pivot interface, the interface being exposed from the base when the door is in the closed state to allow the first part of the door to pivot between the open and closed states.

The door is movable with respect to the base between the closed state, in which the door is extended from the base, and a retracted state in which the door is retracted with respect to the base. The door may be linearly movable and/or slidable between the closed state and the retracted state.

In some embodiments, the base includes a compartment for housing the door in the retracted state, the door being movable into and out of the compartment between the retracted state and the closed state. Typically, the base comprises an outer wall and an inner wall, the compartment being defined between the outer and inner walls, and wherein the recess is formed in the end of the outer wall. Optionally, in the retracted state the pivot interface is located in the compartment, and in the closed state the pivot interface is located outside of the compartment.

The door may be coupled to the base by a slide mechanism and/or a roller mechanism to facilitate movement between the retracted and closed states.

Typically, the base is shaped, for example being panel-like or wall-like, to serve as a wall or a divider.

From a second aspect, the invention provides passenger seating comprising at least one seat and a door assembly according to the first aspect of the invention. The door assembly may be part of a surround structure in which the at least one seat is located. Typically, in the retracted state and in the open state, the door exposes a gap providing passenger access to and from the at least one seat and, in the closed state, the door closes the gap. The passenger seating typically comprises a plurality of rows, each row comprising at least one seat, and wherein the gap is defined between the respective seat surround structure of adjacent rows, or between the seat surround structure of one row and a bulkhead.

The passenger seating may comprise a plurality of rows of at least one seat, the rows being spaced apart to define a gap between adjacent rows, wherein the respective door of the or each respective door assembly of at least one of the rows, when in the closed state, closes the gap between the respective row and the row in front, and wherein, optionally, the at least one seat of each row is located within a respective surround structure, and wherein the respective door of the or each respective door assembly of at least one of the rows, when in the closed state, closes the gap between its surround structure and the surround structure of the row in front.

From another aspect, the invention provides an aircraft seating installation comprising the passenger seating of the second aspect of the invention.

In some embodiments, the door assembly includes a curved inner movable door (which may be referred to as a door blade) and a corresponding curved leading edge on the outer door housing (which may be referred to as the door cassette), wherein, in a hinged, or pivoting, mode of opening (e.g. during emergency egress) the door blade hinges, or pivots, into a void created by the curved leading edge on the door cassette.

Advantageously, some embodiments of the invention allow passenger seating to be provided with door assemblies while having an inter-row pitch that is smaller than required in conventional passenger seating.

The invention may be embodied in passenger seating comprising at least one seat and at least one respective door assembly located at a side of, in front of, or otherwise associated with a respective seat, or row of seats. The respective door assembly may comprise a base portion and a door that, in a primary mode of operation, is movable with respect to the base portion between an open state and a closed state, and wherein the door is configured to support a second mode of opening out of the closed state that is different from the primary mode.

The door may be slidable with respect to the base portion in a fore-and-aft direction between the open state and the closed state in the primary mode. The door may be configured to support the second mode by being formed in first and second parts that are coupled together by one or more hinge that is exposed from the base portion when the door is in the closed state, the first part of the door being pivotable with respect to the second part at the hinge(s). The or each hinge typically provides one or more vertical pivot axis for the door.

In some embodiments the base portion is panel-like in shape and provides a privacy wall for the respective seat, or row of seats, the base portion advantageously including a compartment for housing the door when in the open state.

Although the invention is disclosed herein in the context of passenger seating, in particular aircraft seating, it will be understood that the invention is not limited to such; door assemblies embodying the invention are suitable for use in any application where space is at a premium.

These and other objects, advantages, purposes and features of the present invention will become apparent upon review of the following specification in conjunction with the drawings.

BRIEF DESCRIPTION OF THE DRAWINGS

An embodiment of the invention is now described by way of example and with reference to the accompanying drawings in which.

DETAILED DESCRIPTION OF THE PREFERRED EMBODIMENTS

Figure 1:
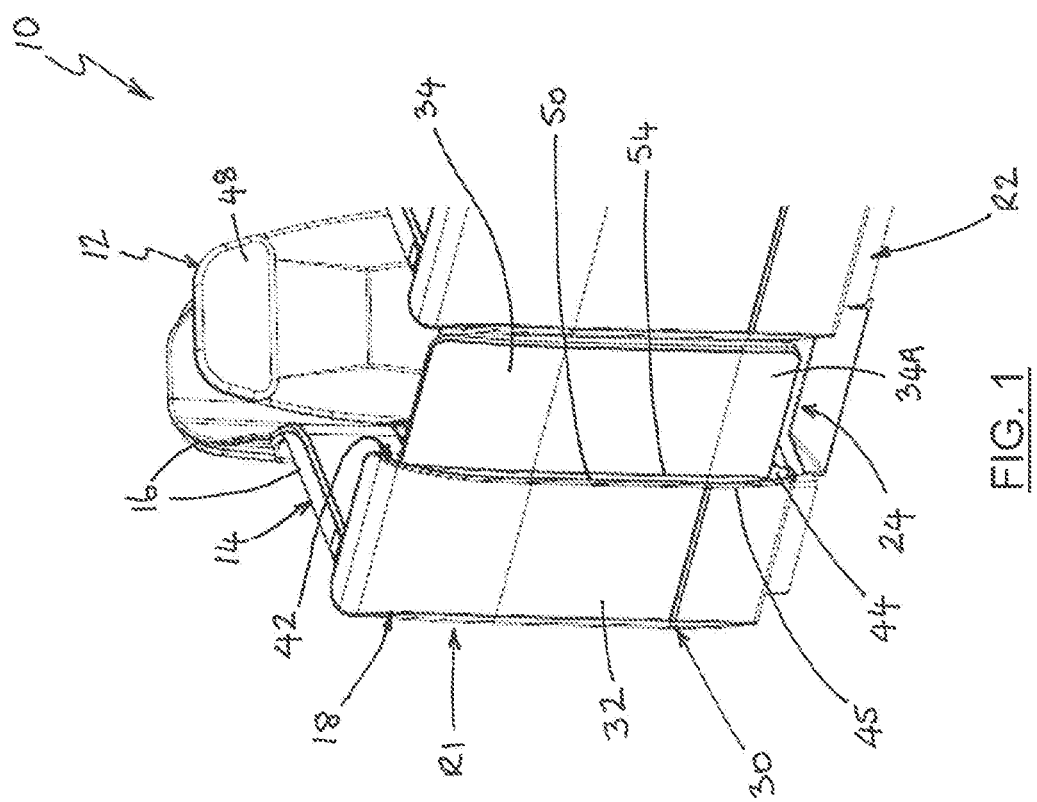
FIG. 1 is a perspective view of passenger seating embodying one aspect of the invention, and including a door assembly embodying another aspect of the invention.

Referring now to the drawings there is shown, generally indicated as 10, passenger seating embodying one aspect of the invention. Passenger seating embodying the invention is particularly suitable for use in vehicles (e.g. aircraft, boats, trains and buses) where the seating is located in a common passenger area, for example an aircraft cabin, having one or more aisles running alongside the seating. In some embodiments, the seating 10 is aircraft seating and is located, in use, in an aircraft cabin (not shown).

In the following description, it is assumed that a seated passenger faces in a forward direction and so terms such as forward, front, rearward, rear and fore-and-aft are intended to be construed accordingly. The term "vertical" is intended to mean perpendicular to the surface on which the seating is located in use.

The seating 10 comprises at least one seat 12. In typical embodiments, there is a plurality of seats 12 arranged in rows, each row having one or more seat 12. In FIG. 1, a first row R1 is shown and has a single seat 12. In alternative embodiments, the row R1 may comprise a plurality of seats. Part of a forward row R2 is also shown. The rows are typically the same as each other and so the same or similar description applies as would be apparent to a skilled person. In general, at the rear of each row and/or in front of it there may be provided more seating (e.g. additional row(s) of seat(s) 12). Alternatively, for example when the seating is installed in a cabin, a bulkhead (not shown) may be located in front of and/or behind the seating 10. Typically, a bulkhead is located adjacent and in front of or behind the first and/or last row. When the seating 10 is located in a cabin, an aisle (not shown) may located alongside the seating 10 on one or both sides, typically running substantially perpendicular with the rows R1, R2. The, or each, aisle may separate the seating 10 from additional seating (not shown but which may be the same as the seating 10), bulkhead or cabin wall (not shown).

The seat 12 is typically located within a seat surround structure 14 that at least partially surrounds the seat 12. The surround structure 14 typically includes a back portion 16 behind the seat 12 and at least one side portion 18. The surround structure 14 may be shared by more than one seat 12 of the same row R1, R2, for example being configured to provide the back portion 16 and side portion(s) for each seat 12. The seats 12 may be of a type that can recline to form a bed.

It will be apparent that the surround structure 14 provides a seated passenger (not shown) with some privacy from other passengers seated in the same row and/or in adjacent row(s), as applicable, and from people in the aisle(s). However, the surround structure 14 must allow space for passengers to access the seat 12 from the aisle and vice versa. Accordingly, the side portion 18 that is, in use, adjacent an aisle is configured to provide a gap 24 for ingress to and egress from the seat 12. In typical embodiments, this means that the side portion 18 does not extend fully and permanently to the surround structure 14 of the row R2 in front, or to a bulkhead in front, as applicable. This is in contrast to the far side portion (not visible) which may extend fully and permanently to the to the surround structure 14 of the row R2 in front, or to a bulkhead in front, as applicable. In this example it is assumed that when the seating 10 is installed, access to the seat 12 is not required from beyond the far side.

This might be because, for example, the far side is, when installed, adjacent a cabin wall or a bulkhead, or is adjacent another seat (in the case of a multi-seat row embodiment), To improve privacy, the side portion 18 comprises a door assembly 30 embodying one aspect of the invention. The door assembly 30 comprises a base portion 32, which typically extends along the aisle-side of the seat 12 typically from the back 16 of the surround structure 14, and is typically panel-like in form. The base portion 32, which is typically substantially rectangular in shape or panel-like, provides a wall adjacent the seat 12 (on the aisle side in this example), typically as part of the surround structure 14. The door assembly also comprises a door 34 that is movable with respect to the base 32 between an open, or retracted, state (FIG. FIGS. 4A and 5A) in which the ingress/egress gap 24 is provided, and a closed, or extended, state (FIGS. 1, 4B, and 5B) in which the gap 24 is closed. It will be understood that the word "closed" in this context does not necessarily mean that the gap 24 is eradicated completely and is therefore intended to embrace "fully closed" and "substantially closed". In some embodiments, and as is illustrated by way of example in FIGS. 1, 4B, and 5B, the arrangement is such that, in the closed state, the door 34 engages with the surround structure 14 of the row R2 in front (or the bulkhead in front as applicable).

In some embodiments, the door 34 is a sliding door, i.e. is slidable with respect to the base 32 between the open (or retracted) and closed (or extended) states. To facilitate sliding movement of the door 34, the door 34 may be coupled to the base 32 by one or more slide mechanism (not shown), for example comprising slide rails and/or rollers, which may be provided at the top and/or bottom of the door 34, or may be linearly movable by any conventional means. Optionally, the base 32 comprises a compartment 42 for housing the door 34 when open (i.e. retracted), the compartment having a mouth 44 through which the door 34 slides into and out of the compartment 42. The base 32 may therefore be described as a door housing. The compartment 42 may be dimensioned to house substantially the entire door 34 when open. Accordingly, when the door 34 is open, the gap 24 is defined between the leading end of the base 32 and the forward surround structure 14/bulkhead. Alternatively, the arrangement may be such that part of the door projects from the base 32 when open in which case the gap 24 is defined between the leading end 33 of the door 34 and the forward surround structure 14/bulkhead. In alternative embodiments, the arrangement may be such that the door 34 slides alongside the base 32 rather than into a compartment in the base.

The door assembly 30 provides some privacy between the seat 12 and the aisle whether or not the door 34 is open since the base 32 extends alongside the seat 12, and is typically panel-like in form. However, greater privacy is provided when the door 34 is closed. The height of the door assembly 30 also affects the privacy afforded to the passenger. It may be preferred that the height of the base 32 and the door 34 is approximately level with the head rest 48 of the seat 12. Optionally, the base 32 and the door 34 are each solid and opaque to maximize privacy. The door 34 is typically substantially rectangular in shape.

In some embodiments, the door assembly 30 includes an actuator or actuation means (not shown) for moving the door 34 from the open state to the closed state and/or from the closed state to the open state. The actuation means may comprise one or more extendible actuator, such as a hydraulic ram, gas spring or mechanical spring, coupled between the door 34 and the base 32, or take any other suitable conventional form. In alternative embodiments, the door 34 may be manually operable, i.e. the actuation means may be omitted, for opening and/or closing.

Figure 4A:
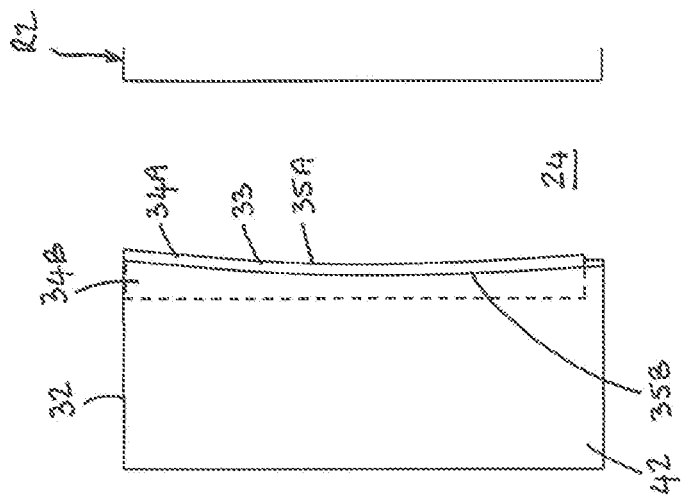
FIG. 4A is a side view of the door assembly in an open state in a first mode of operation.
Figure 5C:
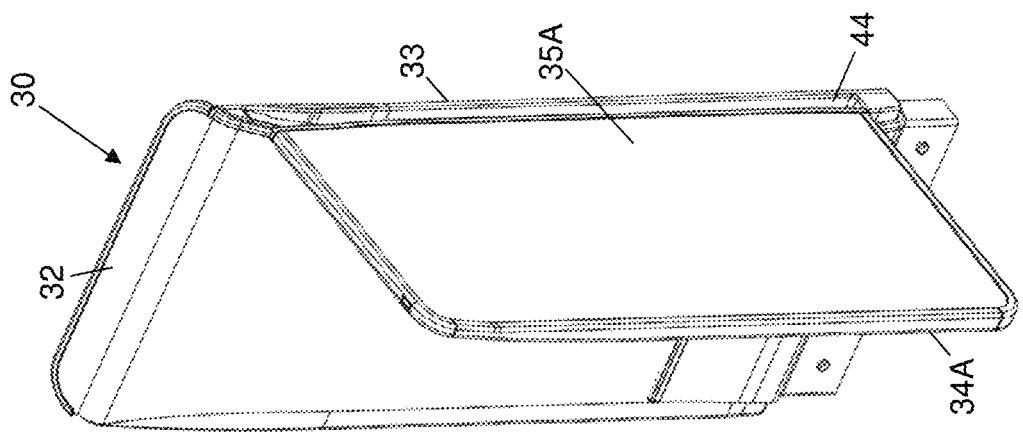
FIG. 5C is a perspective view of the door assembly in the open state of the second mode of operation.
Figure 5B:
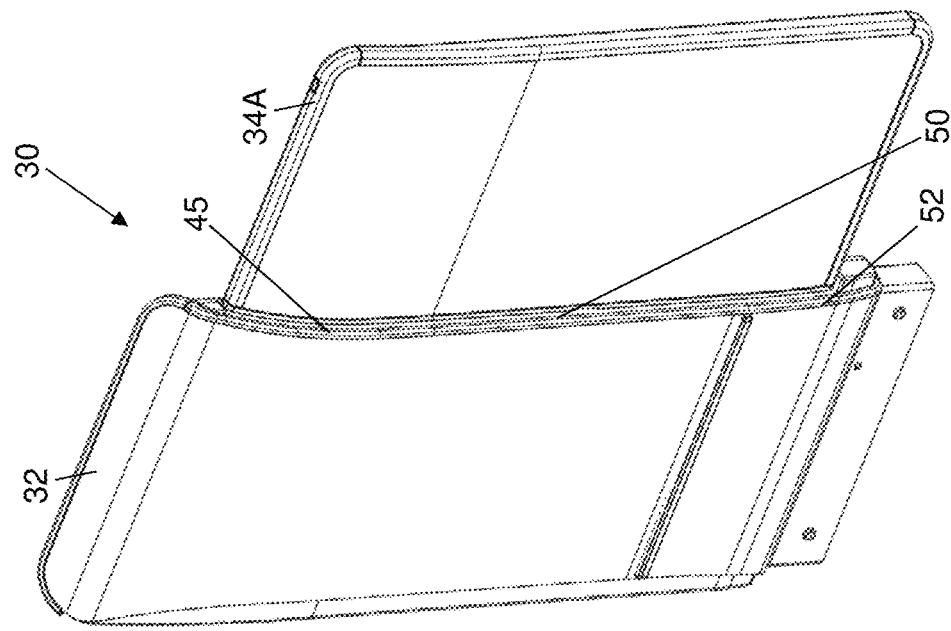
FIG. 5B is a perspective view of the door assembly in the closed state.
Figure 5A:
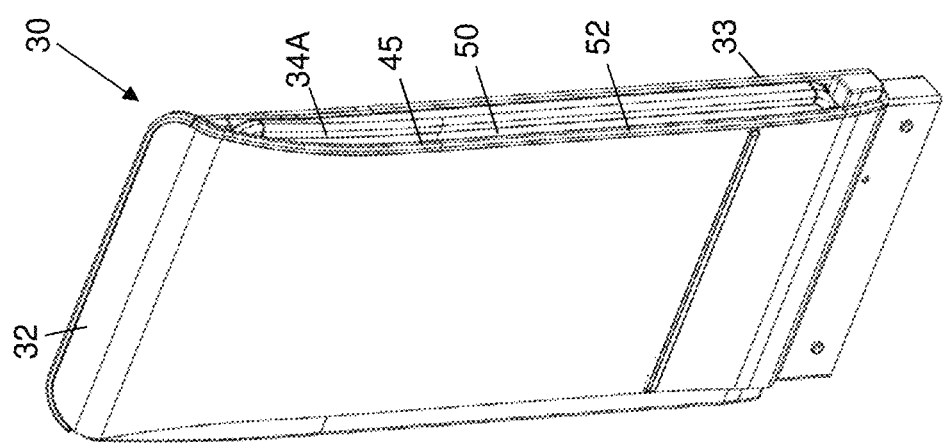
FIG. 5A is a perspective view of the door assembly in the open state in the first mode of operation.

In some embodiments, when the door 34 is closed, the primary means of egress for a seated passenger is to slide the door 34 into the retracted open state shown in FIGS. 4A and 5A, which in some embodiments involves sliding the door 34 rearwards. For reasons of safety, the seating 10, and in particular the door assembly 30, provides, in addition to the primary means, a secondary means for a seated passenger to egress from the seat 12 when the door 34 is closed. The secondary means may be provided by configuring the door assembly 30, and in particular the door 34, to support a secondary mode of operation (in particular a secondary mode of opening) that is in addition to and different from, the primary mode of operation described above.

Figure 2:
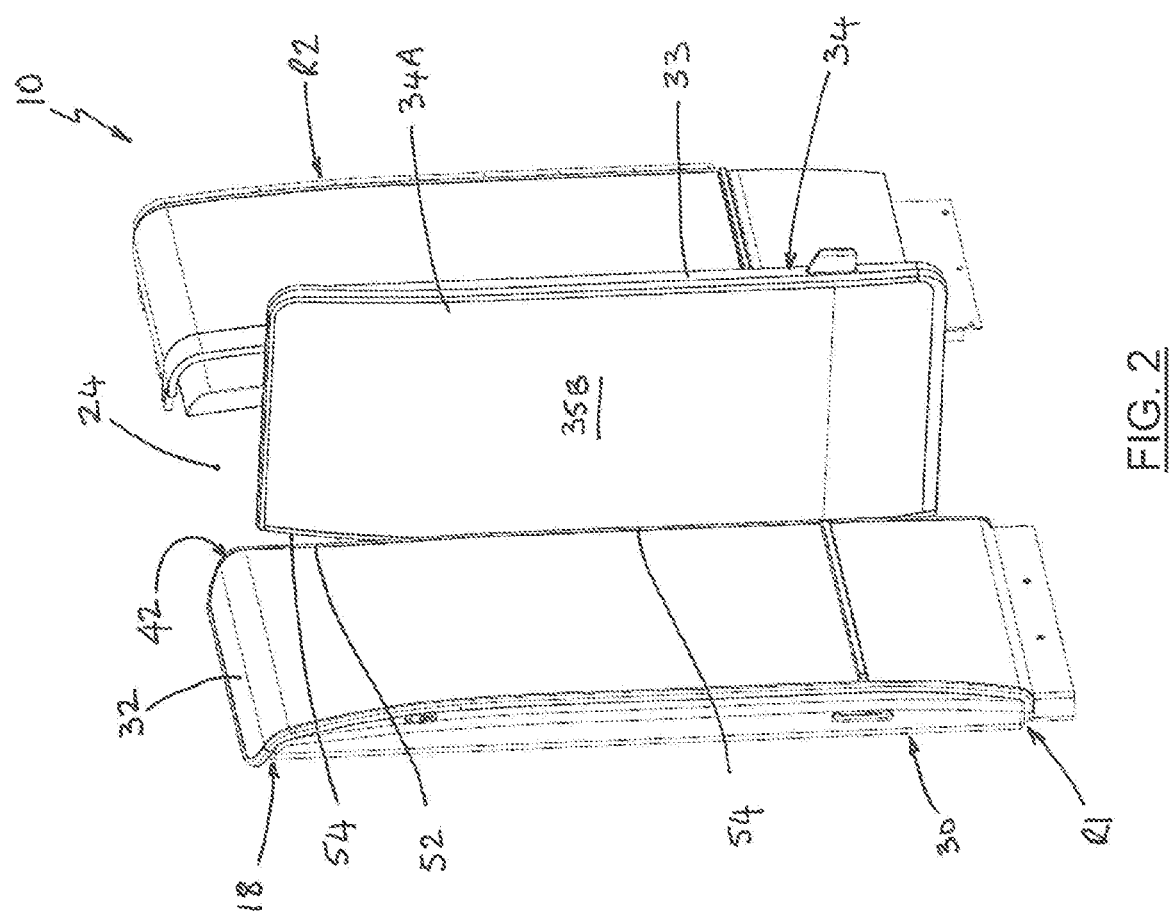
FIG. 2 is a perspective view of the door assembly shown in an open state in a second mode of operation.
Figure 4B:
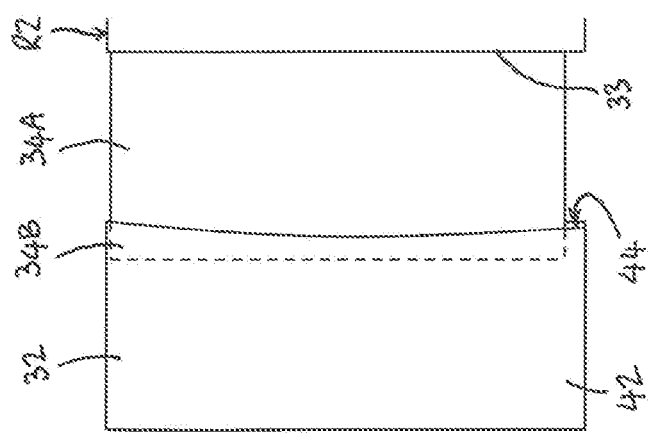
FIG. 4B is a side view of the door assembly in a closed state.
Figure 4C:
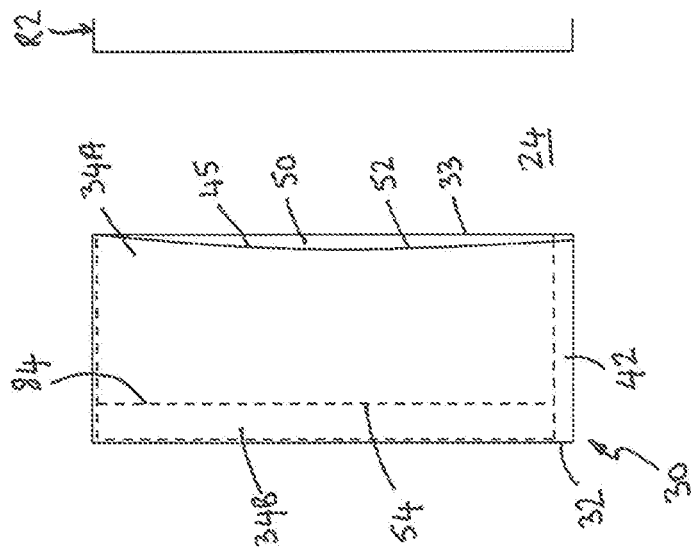
FIG. 4C is a side view of the door assembly in the open state of the second mode of operation.

In some embodiments, and as is illustrated in FIGS. 2, 4C, and 5C, the secondary opening mode is supported by providing the door 34 in first and second parts 34A, 34B that are coupled together at an interface or joint 84. Optionally, the first and second parts 34A, 34B are pivotably coupled together at interface 84 so that the first part 34A can pivot with respect to the second part 34B between the closed state (FIGS. 4B and 5B) and a pivoted open state (FIGS. 4C and 5C). Optionally, the first part 34A pivots through 90° or substantially 90° between the open and closed states. The illustrated pivotable coupling between the first and second parts 34A, 34B is configured to allow pivoting movement of the first part 34A about at least one pivot axis that extends substantially vertically in use, and may be substantially perpendicular to the direction of movement of the door 34 between the open and closed states in the primary mode (which may also be referred to as the fore-and-aft direction), and substantially perpendicular to the transverse direction of the row. One desirable arrangement is such that, when the door 34 is in its closed state (as shown in FIGS. 4B and 5B) the interface 84 and the first part 34A of the door are exposed by the base 32, i.e. are outside of the compartment 42 in the illustrated embodiment. In this state, the second part 34B of the door is typically at least partly located within or in register with the base 32. Accordingly, when the door 34 is closed, the coupling at interface 84 allows its first part 34A to be pivoted with respect to the second part 34B to provide a second mode of opening the door (as shown in FIGS. 2, 4C, and 5C). In some embodiments, the first part 34A of the door is pivotably coupled to the second part 34A at the interface 84 to allow to first part 34A to pivot with respect to the second part 34B and with respect to the base 32 about one or more pivot axis. The pivotable coupling may be provided by one or more hinges 86 which provide the or each pivot axis, the illustrated arrangement being such that the first part 34A is pivotable through 90° or substantially 90° between the open and closed states. Any suitable conventional hinge(s) may be used. Typically, two or more spaced apart, vertically aligned hinges 86 are provided. Optionally, the, or each, hinge is spaced apart from the vertical mid-point of the door. Optionally, the, or each, hinge is spaced apart from the top and bottom of the door. Optionally, the, or each, hinge is a parallel or double-action hinge, for example being configured to provide first and second parallel pivot axes for facilitating pivoting movement of the door 34 between the open and closed states. In some embodiments, the pivotable coupling is configured so that the first part 34A of the door can pivot outwardly away from the seat 12, e.g. into the aisle. Hence, in some embodiments, when the door 34 is in its closed state as shown in FIGS. 4B and 5B, it is capable of being opened to allow egress from the seat 12 by either of two modes: retracting rearwardly to the open state (FIGS. 4A and 5A); or pivoting outwardly in the manner of a hinged door (FIGS. 2, 4B, and 5B). It is envisioned that the passenger does not use the second mode for opening the door 34 routinely; instead, the second mode is intended for use in emergencies.

In some applications, e.g. aircraft seating, industry regulations may specify a minimum size for the gap 24. In particular, a minimum gap size may be stipulated for egress from the seating 10 in the event of an emergency. When the door 34 is open in the second mode (FIGS. 2, 4C, and 5C), the gap 24 is measured to a leading part of the open door 34 and, as such, the gap 24 is smaller than it would be if the door 34 was not present. One option for obtaining the required gap size while accommodating the door 34 is to increase the pitch between the rows of seats. However, this can have the undesirable effect of reducing the number of rows that can fit into a given cabin space. To overcome this problem, a recess 50 is formed in a leading end 52 of the base 32 and, when the door 32 is open in the second mode, a rearward end 54 of the door 32 is received by the recess 50. In particular, the configuration is such that, as the door 32 opens, the rearward end 54 of the door 32 fits into the recess 50 to allow the door 32 to reach its open state (in which it is typically disposed perpendicularly, or substantially perpendicularly, to the front-to-rear direction of the door assembly or passenger seating) without being prevented from doing so by engagement with the leading end 52 of the base 32.

The recess 50 may be provided by a cut-out portion formed in the leading end 52 of the base 32. Optionally, the recess 50 is formed in an outer portion of the leading end 52, i.e. a portion that is on the outside of the base 32, for example such that it faces an aisle in use. This facilitates the outwardly pivoting door 34, which typically pivots through 90° or approximately 90° when pivoting between its open and closed states. The recess 50 may be formed in a leading edge of the leading end 52, such as an outer leading edge, typically as a cut-out formed in the leading edge. In some embodiments, the leading end 52 defines the mouth 44 of the compartment 52, and the recess 50 is formed in an edge 45 of the mouth 44, such as the outer edge, i.e. the edge that is on the outside of the base 32, for example such that it faces an aisle in use. Typically, a corresponding recess is not formed in the corresponding inner edge. Typically, the base 32 comprises an outer wall and an inner wall, the compartment 42 being defined between the outer and inner walls, the recess 50 being formed in the end of the outer wall.

In some embodiments, the recess 50 is formed along the entire length, or substantially the entire length of the leading end 52 (in particular the leading edge 45 in the illustrated embodiment) of the base 32, the length being taken in the vertical direction typically, e.g. from top to bottom. It will be apparent that the recess 50 is recessed with respect to the leading end 52 in the front-to-rear direction of the base 32. The recess 50 may be curved or otherwise concave.

In some embodiments, the door 34 is curved in end cross-section, as can best be seen from FIG. 4C. In particular, the door 34 may be shaped to curve outwardly, i.e. the door 34 may be the to have an inside face 35A (which faces inwardly of the surround structure 14 when the door is closed) and an outside face 35B (which faces outwardly of the surround structure 14 when the door is closed), the outside face 35B being convex and in the inside face 35A being concave, such as correspondingly concave. At least the first part 34A, and optionally also the second part 34B, of the door 34 is shaped in this manner. Optionally, the base 32 is correspondingly curved in end cross-section to match or otherwise correspond with the curvature of the door 34. In particular, it is envisioned that at least the compartment 42 and mouth 44 are correspondingly curved in end cross-section to match or otherwise correspond with the curvature of the door 34. In preferred embodiments, the term "end cross-section" refers to the end-to-end cross-section, for example the cross-section in the end-to-end direction, or the front-to-rear direction, of the door 34, base 32 or compartment 42 as applicable, i.e. the cross-section taken in a plane parallel with the ends. For example, in some embodiments the door 24 is curved in cross-section when viewed in a direction from the leading end 33 to the rearward end 54 of the door 34.

Advantageously, the recess 50 is also curved, such as along its entire, or substantially entire, length. The curvature of the recess 50 may match, substantially match, or otherwise correspond to the curvature of the rearward end 54 of the door 34 (which itself is determined by the curvature of the door 34 described above). As can best be seen from FIGS. 4A and 4B, the illustrated recess 50 is concave. The depth of the recess 50 may vary from embodiment to embodiment but may for example be 0.02 to 0.05 m at its deepest point.

In some embodiments, the respective shape and dimension of the door 34 and of the recess 50 are such that, when the door 34 is pivoted open, the rearward end 54 of the door 34 fits into the recess 50. This arrangement reduces the space in the forward direction that is required to accommodate the door 34, and so facilitates provision of a minimum size of gap 24 without having to increase inter-row pitch. In typical embodiments, the space saving may only be in the region of 2-3 cm, but this saving can make it possible to fit at least one additional row of seat(s) in a given cabin space.

Figure 3:
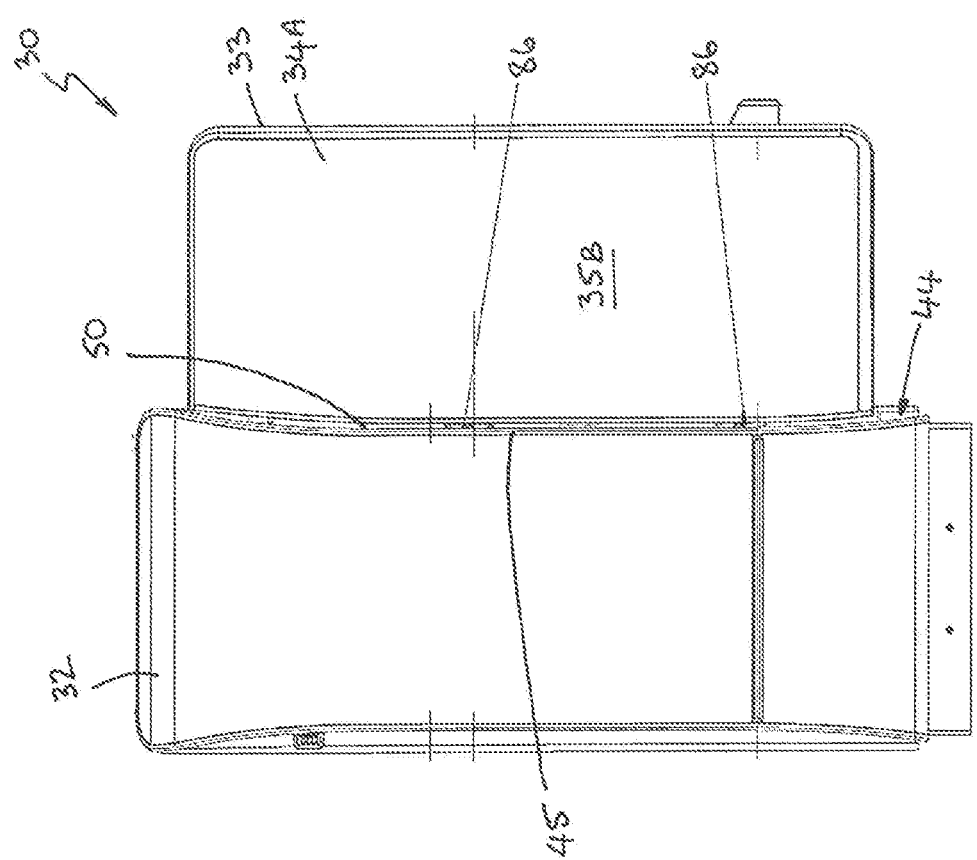
FIG. 3 is a side view of the door assembly shown in a closed state.

In alternative embodiments (not illustrated) the door 34 may be configured to open and close in only one mode, in particular a mode that corresponds to the secondary mode described above. As such the door 34 opens and closes pivotably (as illustrated in FIGS. 4B and 4C) but does not slide or retract into the base 32 as illustrated in FIG. 3A.

In some embodiments, the curvature of the relative parts of the door assembly (in particular the curvature of any one or more of the first and second door parts 34A, 34B, the base 32, the compartment 42, mouth 44 and/or recess 50) is smooth or continuous (as for example can be seen from the end view of door part 34A in FIG. 4C). Alternatively, the curvature may be stepped or discontinuous (not illustrated) such that the relevant part of the door assembly is generally curved, e.g. generally concave or convex as applicable.

In alternative embodiments (not illustrated), the door 34 may be flat, or planar, rather than curved, and the base 32 and recess 50 may be correspondingly shaped, e.g. the recess 50 may be rectangular.

The invention is not limited to the embodiment(s) described herein but can be amended or modified without departing from the scope of the present invention. Changes modifications in the specifically-described embodiments may be carried out without departing from the principles of the present invention, which is intended to be limited only by the scope of the appended claims as interpreted according to the principles of patent law including the doctrine of equivalents.

The invention claimed is:

1. Passenger seating comprising:
   at least one seat; and
   a surround structure in which said at least one seat is located, said surround structure comprising:
      a door assembly, said door assembly comprising:
         a base; and
         a door having a leading end and a rearward end, and being curved in end cross-section such that said door is shaped to curve outwardly of said surround structure;
      wherein said base includes a compartment for housing said door in a retracted state, said base comprising an outer wall and an inner wall, said compartment being defined between said outer and inner walls;

wherein said door is pivotable with respect to said base between a closed state and an open state about at least one pivot axis, and wherein said door is movable into and out of said compartment between the retracted state and the closed state;

wherein when said door is in the closed state, said door is extended from said base;

wherein said base has a leading end that defines a mouth of said compartment;

wherein said leading end of said base comprises a leading edge of said inner wall and a leading edge of said outer wall, said leading edge of said inner wall defining an inner edge of said mouth, said leading edge of said outer wall defining an outer edge of said mouth, said leading edge of said outer wall being concave to define a recess in said leading end of said base and in said outer edge of said mouth, said door and said recess being shaped and dimensioned such that, when said door is in the open state, said rearward end of said door fits into said recess; and wherein said door comprises a first part pivotably coupled to a second part at a pivot interface, said pivot interface being exposed by said leading edge of said outer wall when said door is in the closed state to allow said first part of said door to pivot between the open and closed states, said pivot interface not being exposed by said leading edge of said inner wall when said door is in the closed state.

2. The passenger seating of claim 1, wherein said recess is provided by a cut-out portion in said leading edge of said outer wall.

3. The passenger seating of claim 1, wherein said recess is formed along substantially the entire length of said leading edge of said outer wall.

4. The passenger seating of claim 1, wherein said recess is curved along substantially the entire length of said leading edge of said outer wall, and wherein said recess has a curvature that substantially corresponds to a curvature of said rearward end of said door.

5. The passenger seating of claim 1, wherein said base is curved in end cross-section, and wherein said base has a curvature that substantially corresponds to the curvature of said door.

6. The passenger seating of claim 1, wherein said door has a convex outside face and a concave inside face.

7. The passenger seating of claim 1, wherein said door is linearly movable between the closed state and the retracted state.

8. The passenger seating of claim 1, wherein said base is shaped to serve as a wall or a divider.

9. The passenger seating of claim 1, wherein, in the open state and in the retracted state, said door exposes a gap providing passenger access to and from said at least one seat and, in the closed state, said door closes the gap.

10. Passenger seating comprising:
   at least one seat;
   a surround structure in which said at least one seat is located, said surround structure comprising:
      a door assembly, said door assembly comprising:
         a base; and
         a door having a leading end and a rearward end, and being curved in end cross-section such that said door is shaped to curve outwardly of said surround structure;
   wherein said base includes a compartment for housing said door in a retracted state, said base comprising an outer wall and an inner wall, said compartment being defined between said outer and inner walls;
   wherein said door is pivotable with respect to said base between a closed state and an open state about at least one pivot axis, and wherein said door is movable linearly into and out of said compartment between the retracted state and the closed state;
   wherein when said door is in the closed state, said door is extended from said base;
wherein said base has a leading end that defines a mouth of said compartment; and
   wherein said leading end of said base comprises a leading edge of said inner wall and a leading edge of said outer wall, said leading edge of said inner wall defining an inner edge of said mouth, said leading edge of said outer wall defining an outer edge of said mouth, said leading edge of said outer wall being concave to define a recess in said leading end of said base and in said outer edge of said mouth, said door and said recess being shaped and dimensioned such that, when said door is in the open state, said rearward end of said door fits into said recess;
   wherein said door comprises a first part pivotably coupled to a second part at a pivot interface, said pivot interface being exposed by said leading edge of said outer wall when said door is in the closed state to allow said first part of said door to pivot between the open and closed states; and
   wherein said pivot interface is disposed within at least a portion of said base when said door is in the closed state.

* * * * *